US012231838B2

(12) United States Patent
Costa

(10) Patent No.: US 12,231,838 B2
(45) Date of Patent: Feb. 18, 2025

(54) OUT-EAR AUDIO DEVICE

(71) Applicant: Pedro Antonio Rosa Costa, København NV (DK)

(72) Inventor: Pedro Antonio Rosa Costa, København NV (DK)

( * ) Notice: Subject to any disclaimer, the term of this patent is extended or adjusted under 35 U.S.C. 154(b) by 0 days.

(21) Appl. No.: 18/040,249

(22) PCT Filed: Oct. 21, 2020

(86) PCT No.: PCT/DK2020/000305
§ 371 (c)(1),
(2) Date: Feb. 1, 2023

(87) PCT Pub. No.: WO2021/078339
PCT Pub. Date: Apr. 29, 2021

(65) Prior Publication Data

US 2023/0362530 A1 Nov. 9, 2023

(30) Foreign Application Priority Data

Oct. 22, 2019 (DK) ........................... PA 2019 01236

(51) Int. Cl.
*H04R 1/10* (2006.01)
*H04R 25/00* (2006.01)

(52) U.S. Cl.
CPC ........... *H04R 1/105* (2013.01); *H04R 1/1066* (2013.01); *H04R 25/604* (2013.01); *H04R 2460/13* (2013.01)

(58) Field of Classification Search
CPC .......... H04R 1/10; H04R 25/02; H04R 1/105; H04R 1/1066; H04R 25/604; H04R 2460/13

(Continued)

(56) References Cited

U.S. PATENT DOCUMENTS

2013/0136279 A1* 5/2013 Brown ..................... H04R 1/10 381/151
2014/0098983 A1* 4/2014 Clow ....................... H04R 1/10 381/381
2018/0352316 A1 12/2018 Kucharko et al.

FOREIGN PATENT DOCUMENTS

JP 2001320790 A * 11/2001 ............. H04R 1/105
WO WO-0230151 A2 * 4/2002 ........... H04R 1/1091

OTHER PUBLICATIONS

International Search Report for International Patent Application No. PCT/DK2020/000305, mailed Jan. 27, 2021, 3 pages.

(Continued)

*Primary Examiner* — Sean H Nguyen
(74) *Attorney, Agent, or Firm* — Crowell & Moring LLP; Thomas E. Williams

(57) ABSTRACT

The invention relates to an out-ear audio device comprising a bone conductor transducer (1) configured to transfer an audio signal by means of bone conduction to an ear of a user, the device comprising a housing (2) accommodating the bone conductor transducer (1), the device further comprising holding means (3) configured to releasably attach the housing (2) to the tragus of the user, wherein:

the holding means (3) together with a portion (4) of the outer surface of the housing (2) of the audio device forms a substantially U-shaped structure, where the holding means (3) comprises a contact member (10, 28) formed for contact with an inner surface of the tragus that faces towards the head of the user; and wherein a contact region that is formed for contact with an outer surface of the tragus corresponding to said inner surface of the tragus is provided by a portion (4) of the housing (2), which portion (4) is in vibrational contact with the bone conduction transducer (1), such that vibrations generated by the bone conductor transducer (1) is transmitted to the contact region;

where the contact member and the contact region form a gap (27) between the contact member (10, 28) and the contact region (4); and (Continued)

wherein the holding means (3) is displaceably or pivotally connected to the bone conductor transducer (1) either directly or via the housing (2), such that the distance between the contact member (10) and contact region (4) can be varied, and wherein the housing (2) and/or the holding means (3) is provided with biasing means, such as a spring member 5, 6, 7; 15, 18), that is configured to force the contact member (10, 28) and the contact region (4) against each other, whereby the contact member (10, 28) and the contact region (4), respectively, presses against said inner and outer surfaces of the tragus, when the audio device is provided on the tragus.

16 Claims, 12 Drawing Sheets

(58) Field of Classification Search
USPC .......................................................... 381/326
See application file for complete search history.

(56) References Cited

OTHER PUBLICATIONS

Written Opinion for International Patent Application No. PCT/DK2020/000305, mailed Jan. 27, 2021, 8 pages.
International Preliminary Report on Patentability for International Patent Application No. PCT/DK2020/000305, mailed Apr. 26, 2022, 9 pages.

* cited by examiner (a)

(b)

OUT-EAR AUDIO DEVICE

CROSS-REFERENCE TO RELATED APPLICATIONS

This application is a national stage entry pursuant to 35 U.S.C. § 371 of International Application No. PCT/DK2020/000305, filed on Oct. 21, 2020, which claims priority to DK Patent Application No. PA 2019 01236, filed on Oct. 22, 2019. These applications are incorporated by reference herein in their entirety.

TECHNICAL FIELD

The present invention relates generally to head-worn audio transducer devices, more particularly to bone conduction audio devices and even more particularly to attachment means for attaching such devices to the head or pinna of a user.

BACKGROUND OF THE INVENTION

The application of bone conduction is an alternative or supplementary signal path to traditional provision of sound energy to the middle ear via the ear canal as it has been well known for many years. A traditional application of a bone conductor is within the field of audiology, where it can be used to test middle-ear function. Bone conduction transducers are also known to be useful alternatives to traditional headphone transducers and many such bone conduction audio transducer systems are commercially available.

One important requirement of a bone conduction audio system is that the bone conductor must be positioned on the outer surface of a user's head in a reliable, reproducible and repeatable manner, and such that, the user experiences no serious discomfort when the system is worn. The placement of the bone conductor at the correct position on the head of the user must always be maintained even when the user is wearing the system during motion, for instance when the user is jogging or performing other motion activities.

In most prior art bone conduction audio systems, the bone conductors (usually two are used in order to be able to reproduce stereophonic signals) are attached to a flexible support structure forming a band extending from one bone conductor (for instance in the vicinity of the left ear) via the back side of the users head and terminating at the other bone conductor in the vicinity of the other ear. Such traditional prior art systems often also comprise a hook-like structure at either ear, much like BTE hearing aids, that fixates the respective bone conductor to the pinna.

Alternatively, in some prior art bone conduction audio systems, the left and right bone conductors are integrated into glasses in a manner somewhat similar to hearing glasses.

The prior art also comprises systems with completely separate left and right bone conductors and in such systems each bone conductor is provided in a separate attachment structure, for instance in the form of a hook, somewhat resembling BTE hearing aids, encompassing a portion of the pinna and extending in the space between the pinna and the corresponding portion of the head.

OBJECTS OF THE INVENTION

It is an object of the present invention to provide a bone conductor audio device that can be applied to a region of the head of a user in the vicinity of one of the ears of the user. For stereophonic audio reproduction, two devices according to the invention must hence be used, one at each region of the two ears of the user.

An important requirement for a bone conduction audio device is that it must be positioned and—after removal—repositioned at the correct position on the head of the user. This is important in order to ensure an optimal and reproducible frequency response and sensitivity of the device.

This requires (1) that the housing of the device—and specifically that part of the housing that accommodates the bone conduction transducer—is optimally shaped to ensure the best vibration transmission, a reproducible and repeatable contact with the head of the user, and (2) that the housing is provided with optimally designed holding means that ensures a reliable, comfortable, reproducible and repeatable attachment to the region in the vicinity of either ear of the user.

The holding means should preferably be easy to manipulate by the user in such a manner that the above mentioned reliable and reproduceable attachment can easily be obtained.

Preferably, the presence of the bone conductor should not interfere with the normal passage of sound into the ear canal of the user, i.e. the ear canal should be kept open despite the presence of the bone conductor. Keeping the ear canal open allows the user to listen to for example music via the bone conduction audio system without being cut off from the surroundings, which is important if for instance the bone conduction audio system is used when the user moves about outdoors, such as when he is using the system while riding his bicycle on a busy street.

Furthermore, the ear canal of the user should be kept as open as possible thereby avoiding occlusion effect.

By the application of the device according to the present invention, transmission of acoustic energy from the device to the hearing organ of the user takes place not only through bone conduction, as with prior art devices, but in fact through a combination of bone conduction (transmission of vibrations) from the housing of the device that contains the bone conductor transducer, and transmission of vibrations of the tragus as well as an acoustic signal generated by the vibrations of the device and tragus and transmitted as air-conducted acoustic energy through the ear canal of the user. This combination of transmission paths contributed to the substantially optimal signal transmission from the device to the hearing organ of the user.

DISCLOSURE OF THE INVENTION

The above and further objects and advantages are according to the invention obtained by the provision of an out-ear audio device comprising a bone conductor transducer configured to transfer an audio signal by means of bone conduction to an ear of a user, the device comprising a housing accommodating the bone conductor transducer, the device further comprising holding means configured to releasably attach the housing to the tragus of the user, wherein:

- the holding means together with a portion of the outer surface of the housing of the audio device forms a substantially U-shaped structure, where the holding means comprises a contact member formed for contact with an inner surface of the tragus that faces towards the head of the user; and
- wherein a contact region that is formed for contact with an outer surface of the tragus corresponding to the inner surface of the tragus is provided by a portion of the housing, which portion is in vibrational contact with the bone conduction transducer, such that vibrations generated by the bone conductor transducer is transmitted to the contact region;

where the contact member and the contact region form a gap between the contact member and the contact region; and wherein the holding means is displaceably or pivotally connected to the bone conductor transducer either directly or via the housing, such that the distance between the contact member and contact region can be varied, and wherein the housing and/or the holding means is provided with biasing means, such as a spring member that is configured to force the contact member and the contact region against each other, whereby the contact member and the contact region, respectively, presses against the inner and outer surfaces of the tragus, when the audio device is provided on the tragus.

In an embodiment of the invention, the holding means comprises a portion that is in direct mechanical connection with a surface portion of the bone conduction transducer.

In an embodiment of the invention, the holding means comprises a spring member, a portion of which is in mechanical connection with a portion of the bone conductor transducer either directly or through an intermediate member.

In an embodiment of the invention, the holding means comprises a pivot arm at one longitudinal end of which the contact member is provided, the pivot arm being connected to a torsional spring member comprising a first arm, a second arm and an intermediate coil portion, which torsional spring member biases the contact member against the contact region.

In an embodiment of the invention, the first arm of the torsional spring member is in direct mechanical connection with a surface portion of the bone conductor transducer.

In an embodiment of the invention, the pivot point of the pivot arm is located in the open central region of the intermediate coil portion of the torsional spring member.

In an embodiment of the invention, the holding means comprises two parts hingedly or pivotally connected at a section and biased by a member, such as a spring, forcing the longitudinal end of each of the two parts adjacent to the housing against each other, where the housing is provided at the longitudinal end of one of the two parts of the holding means and where the other of said two parts of the holding means adjacent to the housing is provided with a corresponding attachment portion or protrusion that together with a bottom portion of the housing provides an attachment region configured to attach the holding means releasibly to the tragus of a user.

In an embodiment of the invention, the holding means are configured as a structure resembling that of a traditional clothes peg.

In this embodiment, the biasing member could be a torsion spring as often used in traditional clothes pegs, but other biasing means could also be used and would fall within the scope of the present invention.

In an embodiment of the invention, the housing is tilted relative to said attachment portion such that the bottom surface of the housing in the closed state of the holding means forms an angle with the top surface of the attachment portion or protrusion, which angle is greater than zero.

In an embodiment of the invention, the housing is provided on one longitudinal end of a first part of the holding means and where the housing is provided with a surface portion configured for establishing contact to the outer surface of the tragus of a user and where a second part of the holding means is provided opposite to the surface portion of the housing and where the second part of the holding means is provided with a corresponding surface portion configured for establishing contact to the inner surface of the tragus of a user, where the surface portion of the housing and the corresponding surface portion are substantially parallel to each other, when the holding means is in the closed state without the device being provided on the tragus of a user.

In an embodiment of the invention, the holding means comprises a pivot arm pivotally connected to the housing of the device, where the pivot arm comprises a bended arm section and an internal arm section, where the bended arm section together with a contact region on the housing forms a gap configured to accommodate the tragus of a user, where the device is provided with user operating means configured to be movable between a position where the gap is maximally open and a position where the gap is minimally open, where the internal arm section is biased in a direction that will pivot the pivot arm such that the width of the gap is reduced, when the user operating means is displaced in a direction that enables the pivot arm to undergo pivotal movement relative to the housing of the device.

In an embodiment of the invention, the holding means comprises a pivot arm pivotally connected to the housing of the device, where the pivot arm comprises a bended arm section and a user operating arm section, where the pivot arm is pivotally mounted on a pivot axle connected to the housing, where the bended arm section together with a contact region on the housing forms a gap configured to accommodate the tragus of a user, where the device is provided with biasing means acting on the housing and the user operating arm section thereby forcing the user operating arm section away from the housing and the bended arm section in a direction towards the contact region of the housing.

In an embodiment of the invention, the holding means comprises a first surface portion facing a correspondingly shaped second surface portion of the housing, where the first and second surfaces portions are configured such that they can undergo a sliding movement relative to each other, whereby the width of the gap can be varied, and where the second surface portion is provided with first engagement means corresponding to second engagement means provided on the first surface portion.

In an embodiment of the invention, the first engagement means comprises elongate recesses and the second engagement means comprises protrusions configured to correspond to the recesses, such that the protrusions can undergo a sliding movement in the recesses.

In an embodiment of the invention, the second engagement means comprises elongate recesses and said first engagement means comprises protrusions configured to correspond to the recesses, such that the protrusions can undergo a sliding movement in the recesses.

In an embodiment of the invention, the device is provided with microphone means configured to pick up sounds in the surroundings of the user, where the output signal from the microphone means is provided to processing means configured to provide a processed version of the output signal from the microphone and provide the processed version to the bone conductor, whereby the device can be used for hearing assistance or other audio processing features.

An important advantage of the holding means provided by the present invention is that upon placement of the audio device at the correct position on the head of the user, the shape of the tragus of the user is not undesirably deformed by the holding means pressing against edge portions of the tragus, as the gap formed between the holding means and the housing of the audio device can be larger than the thickness of the tragus. This advantageously contributes to the desired, and indeed essential, reproducibility and repeatability of the placement for the audio device on the head of the user.

BRIEF DESCRIPTION OF THE DRAWINGS

Further benefits and advantages of the present invention will become apparent after reading the detailed description of non-limiting exemplary embodiments of the invention in conjunction with the accompanying drawings, wherein:

FIGS. 9(*e*), 9(*f*), 9(*g*) and 9(*h*) show the third embodiment of a device according to the invention in the open state of the holding means;

DETAILED DESCRIPTION OF THE INVENTION

The principles of the invention will be illustrated by various embodiments hereof. It is however understood that a person skilled in the art may conceive other embodiments than those shown and described in the detailed description of the invention and that the scope of the invention is defined by the independent claims.

Figure 1:
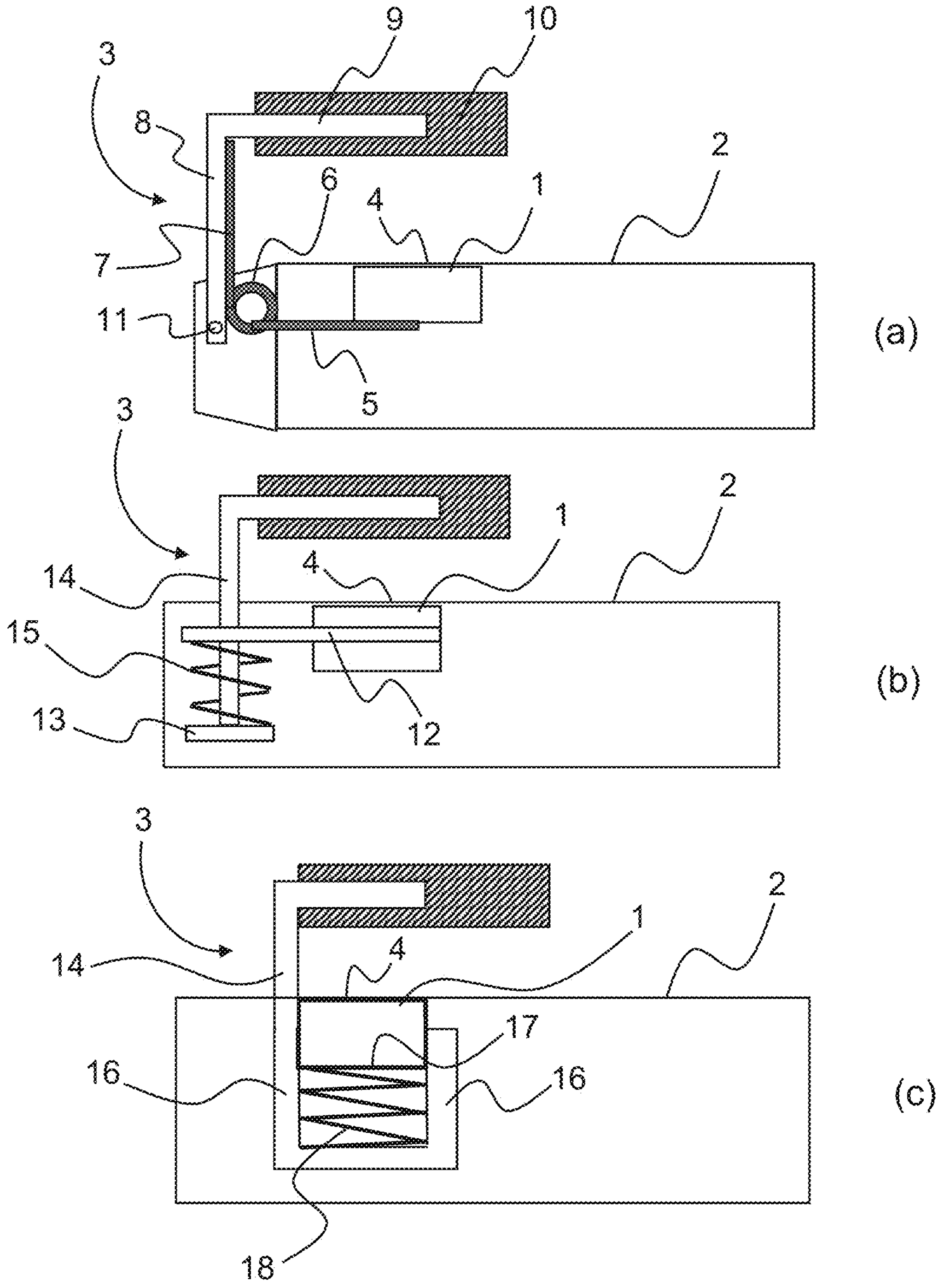
FIGS. 1(*a*), (*b*) and (*c*) show schematic side views of a device according to an embodiment of the present invention, where (a) shows a pivotal version and figures (b) and (c) show displaceable versions of holding means used to attach the device to the tragus of a user.

FIGS. 1(*a*), (*b*) and (*c*) show schematic side views of a device according to an embodiment of the present invention, where (a) shows a pivotal version and figures (b) and (c) show displaceable versions of holding means used to attach the device to the tragus of a user.

With reference to FIG. 1(*a*) there is shown an embodiment of a device belonging to the pivotal version according to the invention comprising a housing 2 containing a bone conduction transducer 1 in contact with a surface portion 4 of the housing 2. The device is provided with holding means generally indicated by reference numeral 3 and comprising a bended pivot arm 7, 9 that can pivot about an axle 11 in fixed connection to the housing 2. Portion 9 of the pivot arm is provided with a first contact member configured for contact with the inner surface of the tragus of the outer ear of the user. Similarly, the surface region 4 of the housing is formed 5 for optimal contact with the outer surface of the tragus opposite the inner surface mentioned above. The bended pivot arm 7, 9 is biased by means of a torsion spring having first and second legs 5, 7 and a coiled portion 6. One leg 7 is in contact with portion 8 of the bended pivot arm and the other leg 5 is in contact with the outer surface of the bone conduction transducer 1. The torsion spring is configured to force the contact member 10 against the 10 surface portion 4 of the housing, such that when the device is fitted on the outer ear of the user, the tragus is pressed firmly between the contact member 10 and the surface portion 4 of the housing 2. This arrangement ensures that an optimal and repeatable vibration transmission is always obtained from the bone conduction transducer 1 to the tragus of the user and hence to the inner ear of the user.

With reference to FIG. 1(*b*) there is shown an embodiment of a device belonging to the displaceable version according to the invention comprising a housing 2 containing a bone conduction transducer 1 in contact with a surface portion 4 of the housing 2. The device is provided with holding means generally indicated by reference numeral 3 and comprising a bended displaceable arm 14, that can be displaced substantially perpendicularly to the housing 2. Portion 14' of the pivot arm is provided with a first contact member 10 configured for contact with the inner surface of the tragus of the outer ear of the user. Similarly, the surface region 4 of the housing is formed for optimal contact with the outer surface of the tragus opposite the inner surface mentioned above. The bended displaceable arm 14 is biased by means of a spring 15. One longitudinal end of the spring 15 is in contact with the surface of the bone conduction transducer 1 via an intermediate member 12 and the other longitudinal end of the spring 15 is in contact with a plate member 13 that is provided on the displaceable arm 14. The spring 15 is configured to force the contact member 10 against the surface portion 4 of the housing, such that when the device is fitted on the outer ear of the user, the tragus is pressed firmly between the contact member 10 and the surface portion 4 of the housing 2. This arrangement ensures that an optimal and repeatable vibration transmission is always obtained from the bone conduction transducer 1 to the tragus of the user and hence to the inner ear of the user.

With reference to FIG. 1(*c*) there is shown a second embodiment of a device belonging to the displaceable version according to the invention comprising a housing 2 containing a bone conduction transducer 1 in contact with a surface portion 4 of the housing 2. The device is provided with holding means generally indicated by reference numeral 3 and comprising a bended displaceable arm 14, 14' that can be displaced substantially perpendicularly to the housing 2. Portion 14' of the pivot arm is provided with a first contact member 10 configured for contact with the inner surface of the tragus of the outer ear of the user. Similarly, the surface region 4 of the housing is formed for optimal contact with the outer surface of the tragus opposite the inner surface mentioned above. The bended displaceable arm 14, 14' is biased by means of a spring 18 acting directly between a surface (bottom) portion of the bone conduction transducer 1 and a lower longitudinal section 16 of the bended displaceable arm. The spring 18 is configured to force the contact member 10 against the surface portion 4 of the housing, such that when the device is fitted on the outer ear of the user, the tragus is pressed firmly between the contact member 10 and the surface portion 4 of the housing 2. This arrangement ensures that an optimal and repeatable vibration transmission is always obtained from the bone conduction transducer 1 to the tragus of the user and hence to the inner ear of the user.

It is understood, that other versions of pivotal and displaceable holding means could also be envisaged by a skilled person and that such other embodiments would also fall within the scope of protection as defined by the independent claim.

Figure 2:
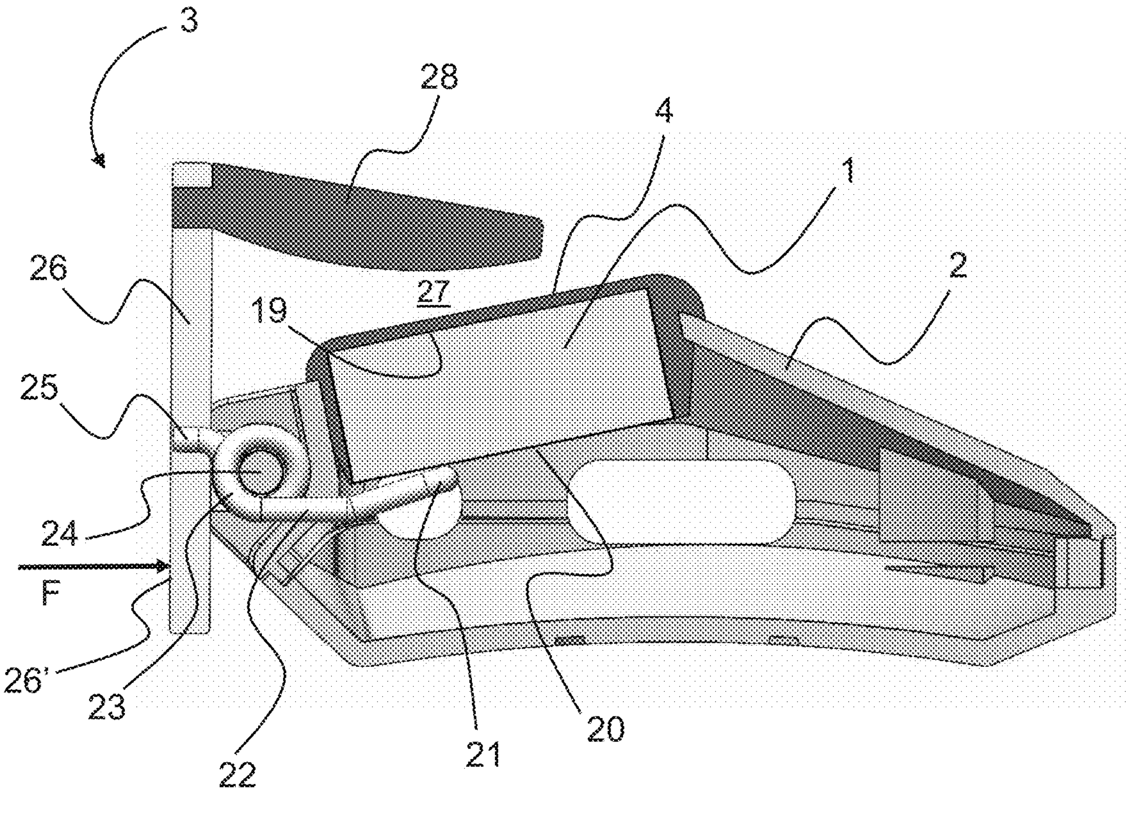
FIG. 2 shows a schematic side view of an embodiment of the device according to the invention, wherein the holding means are of the pivotal version as illustrated in FIG. 1(*a*)

With reference to FIG. 2 there is shown a schematic side view of a practical implementation of an embodiment of the device belonging to the pivotal version according to the invention. This embodiment comprises the housing 2 containing the bone conduction transducer 1, of which a top surface is in contact with the contact region 4 of the housing that is designed to fit optimally to the outer surface of the tragus of the user. The device is further provided with a pivot arm 26, to one longitudinal end of which there is attached a contact member 28 that may be replaceable, such that different dimensions and shapes of contact members can be used that are optimal for a given user.

Between a surface portion (here the bottom portion) of the bone conduction transducer 1 and the pivot arm 26 there is provided a torsional spring member 21, 22, 23, 25, the other longitudinal end 25 of which is attached to the pivot arm 26. In the shown embodiment, the pivot axle 24 about which the pivot arm rotates is provided in the central tubular space of the coiled portion 24 of the torsion spring, such that the torsion spring both serves the function of biasing the pivot arm and also of providing the pivot point of the pivot arm. The pivot axle 24 is connected to a part of the housing 2.

Between the contact member 10 and the contact region 4 there is formed a gap 27 configured to accommodate the tragus of the user.

The lower (as seen in the figure) portion 26' of the pivot arm 26 can be acted on by the user as indicated by the arrow F, thereby pivoting the pivot arm in the counter clockwise direction (as seen in the figure) and thus increasing the width of the gap 27 in order to fit the device on the tragus or remove a fitted device from the tragus of the user.

Figure 3:
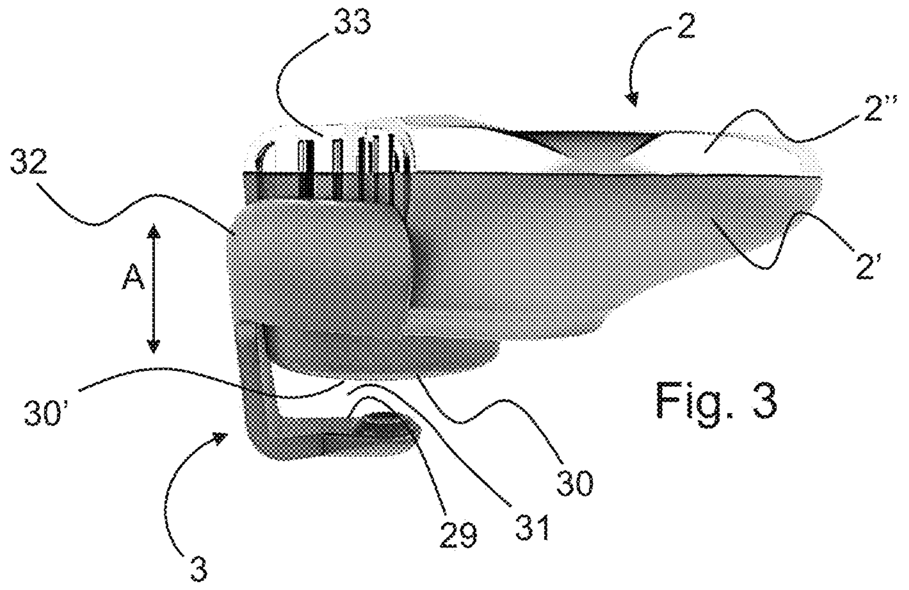
FIG. 3 shows a side view of an embodiment of a device according to the invention.

With reference to FIG. 3 there is shown a side view of an embodiment of a device of the displaceable version according to the invention comprising a housing 2 comprising a bottom part 2' and a top part 2". A bone conductor transducer is accommodated within the housing, c.f. FIG. 3 reference numeral 1. The device comprises holding means 3 displaceably attached to the housing as indicated by the arrow A and configured for releasable or removable attachment of the housing 2 to the tragus of an outer ear. In the shown embodiment, the holding means 3 together with a portion 30 of the outer surface of the housing 2 of the device forms a substantially U-shaped structure where the holding means comprises a first contact region 29 formed for contact with an inner portion of the tragus facing towards the head and where the portion 30 of the outer surface of the housing 2 comprises a second contact region or surface 30' formed for contact with an outer portion of the tragus corresponding to the opposite inner portion of the tragus, thereby forming a gap 31 between the first and second contact regions 29, 30'.

As shown in FIG. 3, the holding means 3 is displaceable relative to the housing 2, such that the distance between the first and second contact regions 29, 30' can be varied.

Figure 5:
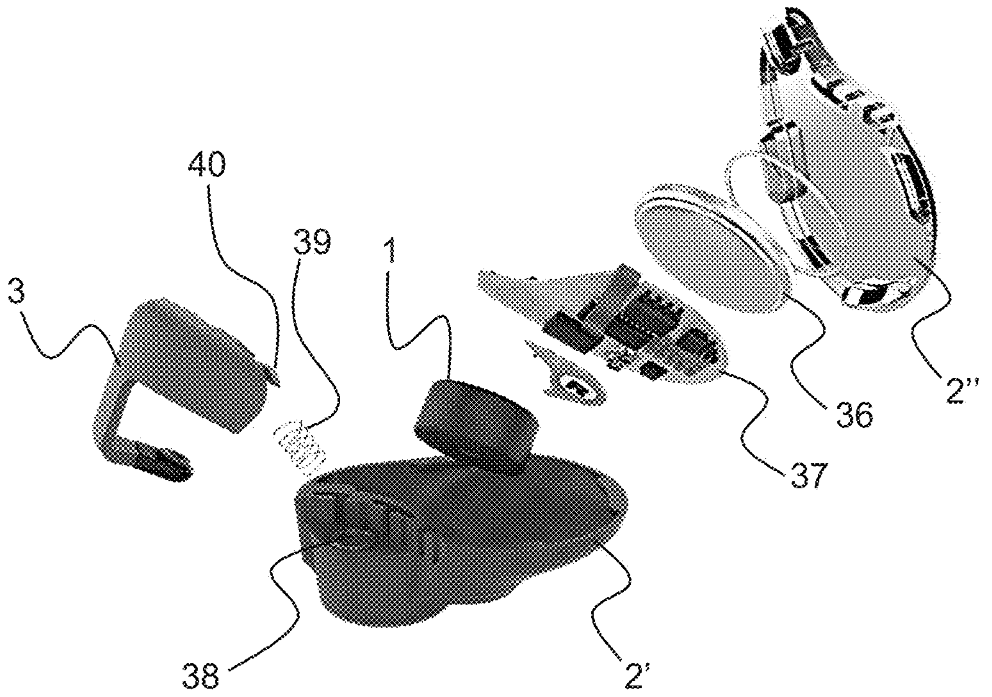
FIG. 5 shows an exploded view of the embodiment of the invention shown in FIGS. 3 and 4.

The housing 2 and/or the holding means 3 is provided with biasing means 39 (c.f. FIG. 5) that forces the first and second contact region 29, 30' against each other, whereby the first and second contact surfaces 29, 30' respectively presses against the inner and outer surfaces of the tragus, thereby ensuring transmission from the bone conductor transducer to the head of a user as well as a fixed, reliable and reproducible/repeatable positioning of the device on and in the vicinity to the tragus.

The displacement of the holding means 3, relative to the housing 2, is facilitated by the presence of a handling portion 32 formed such that it can slide in the direction of the arrow A on a correspondingly shaped portion 33 of the housing 2. Specifically, the inner portion 35 of the handling portion 32 is shaped corresponding to the shape of the portion 33 of the housing.

Figure 4:
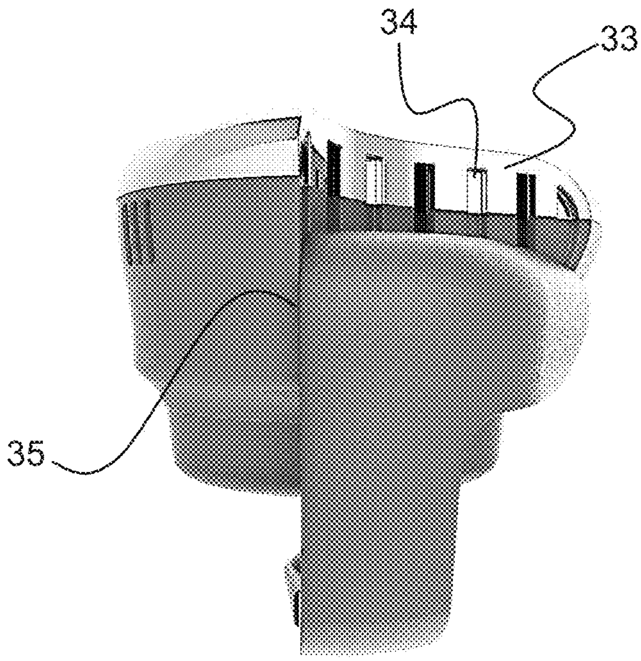
FIG. 4 shows an end view of the embodiment of the invention shown in FIG. 3.

With reference to FIG. 4 there is shown an end view of the embodiment of the invention shown in FIG. 3. As it appears from FIG. 4, in this embodiment of the device according to the invention, the portion 33 of the housing 2 is provided with a plurality of elongated, rectangular recesses 34, the cross sectional shape and positioning of which on the portion 33 corresponds to the cross sectional shape and positioning of outwardly extending protrusions provided on the surface 35 of the handling portion 329.

With reference to FIG. 5 there is shown an exploded view of the embodiment of the invention shown in FIGS. 3 and 4. This embodiment comprises basically the two parts of the housing 2' and 2" that in the closed state of the housing 2 defines an inner cavity that can accommodate a battery 36, various electronic components 37 and the bone conduction transducer 1.

In embodiments of the invention where the device is used as an assistive hearing device, the inner cavity may also comprise microphone means and associated amplification and/or signal processing means that are needed for this function of the device.

In the embodiment shown in FIG. 5, the biasing means 39 that forces the first and second contact region 29, 30' against each other is a spring 39 that is in connection, at one longitudinal end of the spring, with the holding means 3 and at the other longitudinal end of the spring with the bottom of the tubular recess 38, in which the spring 39 is accommodated in the housing portion 2'. Thus, when the user moves the holding means away from the housing, the spring is compressed and when the user lets go of the holding means, the spring forces the holding means towards the housing, thereby reducing the width of the gap 31. It is however understood that other types and placements of biased means could also be used provided that such means forces the first and second contact region 29, 30' against each other.

Figure 6:
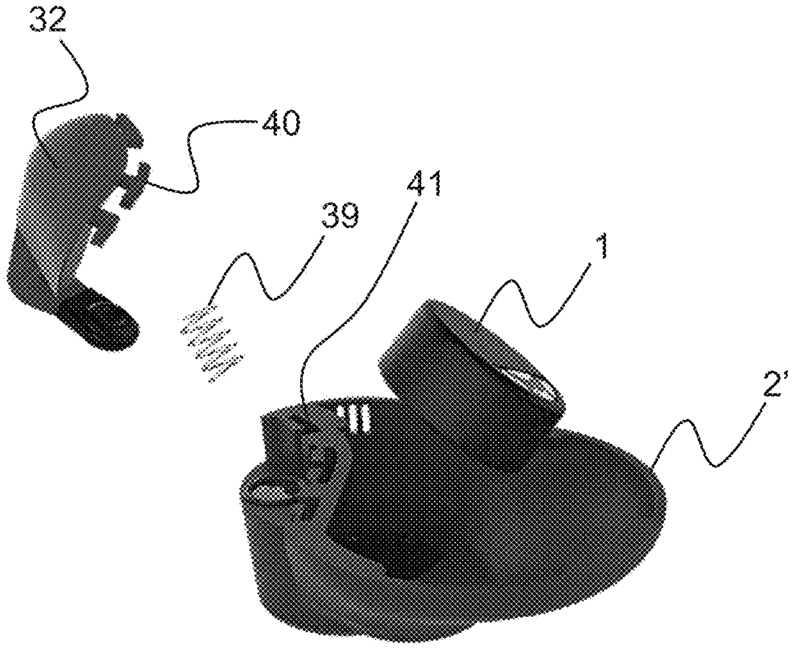
FIG. 6 shows the second part of the housing, bone conductor transducer and holding means of the embodiment of the invention shown in FIGS. 3, 4 and 5.

With reference to FIG. 6 there is shown the second part of the housing 2', the bone conductor transducer 1 and holding means 3 according to the embodiment of the invention shown in FIGS. 3, 4 and 5. FIG. 6 illustrates the configuration of the outwardly extending protrusions 40 that correspond to the recesses 34 in the second surface 33 on the second part 2" of the housing 2.

It is understood that the displaceable holding means described in FIGS. 3 through 6 is only one possible implementation of holding means that can be applied in the device according to the present invention.

Figure 7:
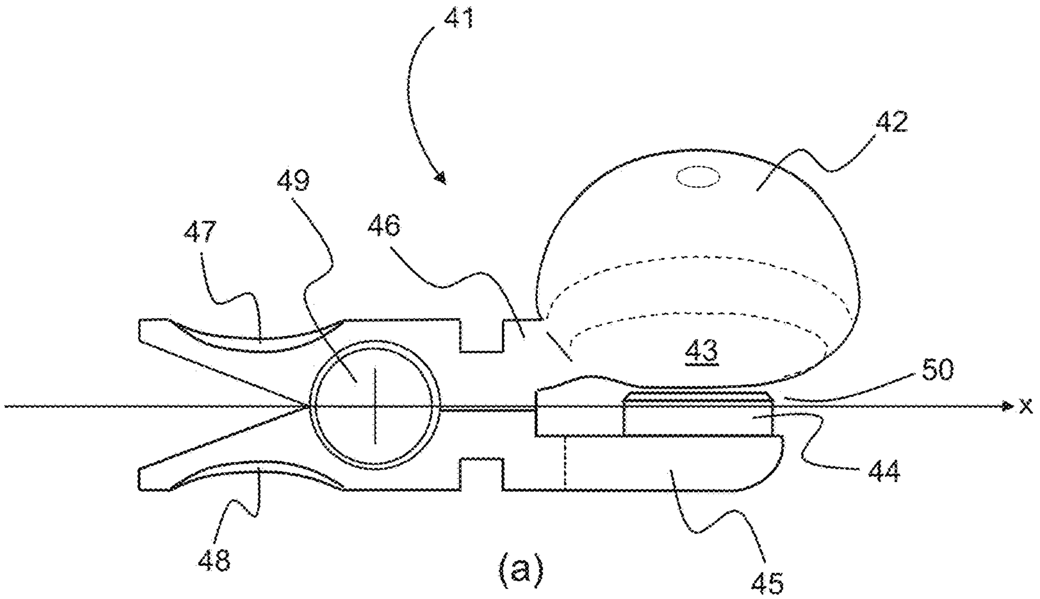
FIGS. 7(*a*) and 7(*b*) show a second embodiment of a device according to the invention in the closed state of the holding means.
Figure 7:
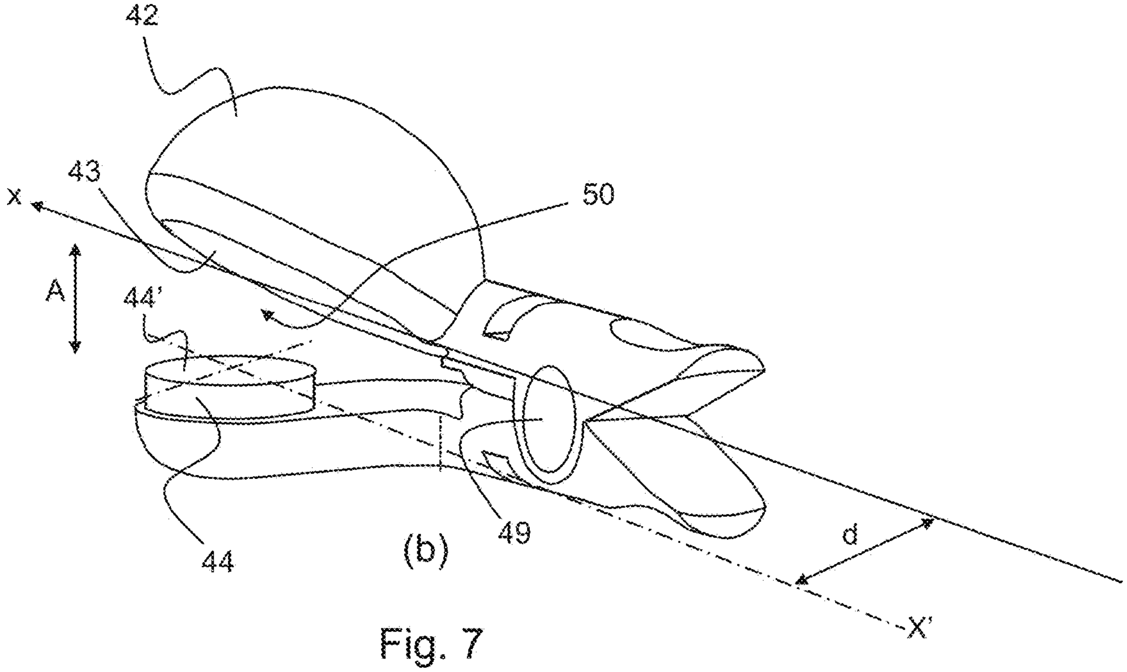

With reference to FIGS. 7(*a*) and 7(*b*) there is shown an embodiment of the invention of the pivotal version generally indicated by 41 in FIG. 7(*a*), in which alternative holding means is applied that somewhat resembles the structure of a clothes peg. FIGS. 7(*a*) and (*b*) show the second embodiment in the closed state of the holding means. The holding means comprises basically two parts 45 and 46 hingedly connected at a section 49 and biased by a spring or similar element that is not shown in FIG. 7. The holding means according to this embodiment comprises a handling portion 47, 48 and an attachment region 50 configured to attach the holding means releasibly to the tragus of a user. The attachment region 50 is on the one hand formed by the bottom portion 43 of the housing 42 that among others accommodates the bone conduction transducer and a corresponding protrusion 44 on the opposite part 45 of the holding means. In the closed state of the holding means shown in FIGS. 7(*a*) and (*b*) a gap 50 is formed between the two portions 45 and 46 of the holding means, which gap is configured such that it can accommodate the tragus of the user. The embodiment of the device shown in FIGS. 7(*a*) and (*b*) extends longitudinally as indicated by the longitudinal axis x with the handling portion 47, 48 at one longitudinal end portion of the device and the attachment region at the opposite longitudinal end of the device. In this embodiment of the invention, the bottom portion 43 of the housing 42 is inclined relative to the top portion 44' of the protrusion 44, i.e. the bottom portion 43 of the housing 42 is not parallel with the top portion 44' of the protrusion 44.

As shown in FIG. 7(*b*), both the housing 42 and the protrusion 44 are laterally displaced to one side relative to the longitudinal axis x by a distance d. It is however noted that the housing 42 and the protrusion 44 may not be laterally displaced by equal distances from the longitudinal axis.

In this embodiment of the device according to the invention, the housing 42 and the protrusion 44 are angled (inclined) relative to each other, i.e. the bottom portion 43 of the housing (that is in contact with the outer surface of the tragus, when the device is worn by a user) is in the closed state not in parallel with the top surface 44' of the protrusion 44. This is contrary to the embodiment of the device according to the invention that will be described in detail below and which is shown in FIGS. 8(*a*) through 8(*h*), where the corresponding portions of the holding means are substantially in parallel in the closed state of the device.

Figure 8:
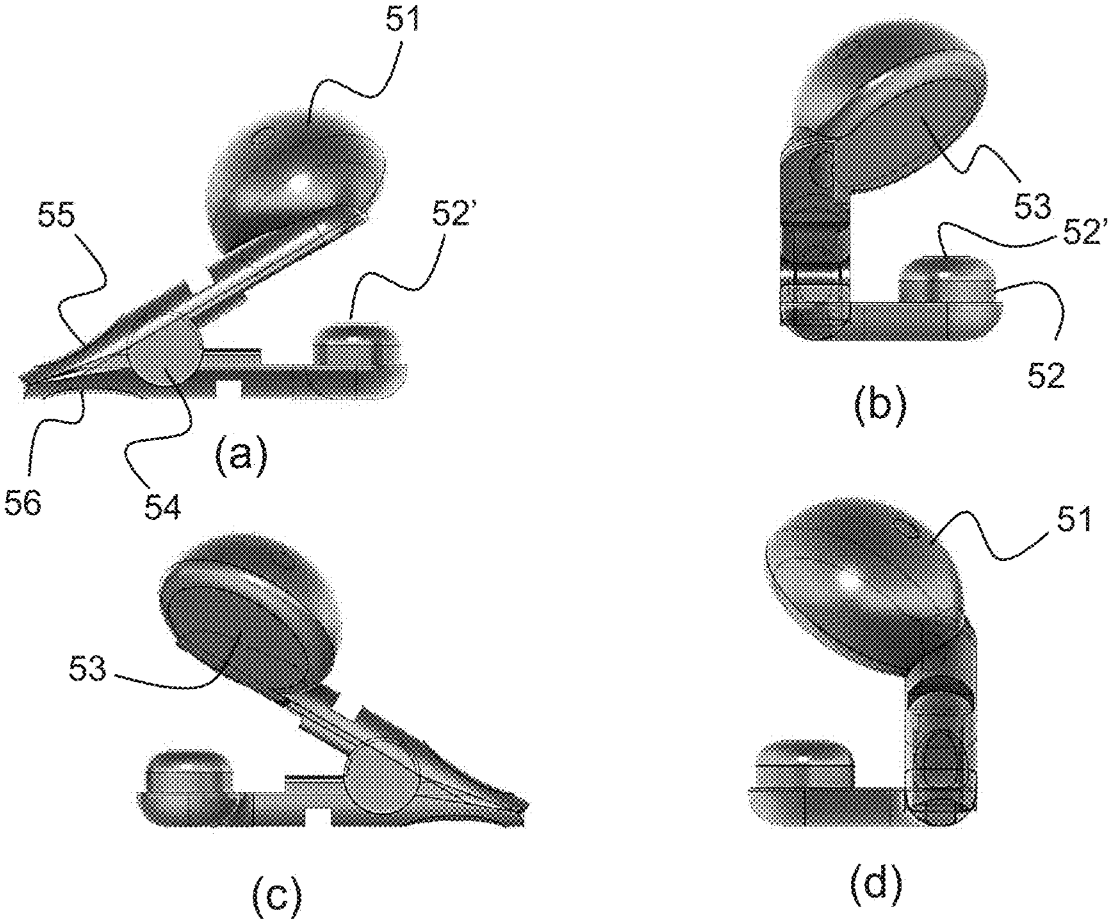
FIGS. 8(*a*), 8(*b*), 8(*c*) and 8(*d*) show the second embodiment of a device according to the invention in the open state of the holding means.

With reference to FIGS. 8(*a*) through 8(*d*) there are shown perspective representations of an embodiment of the device according to the invention of the kind described above in connection with FIG. 7 in the open state of the holding means. These figures show the housing 51 with the contact region or surface 53, the contact member or protrusion 52 with the upper surface 52' facing the contact region 53 of the housing 51, the pivot section 54 and the user-operable sections 55 and 56 of the holding means. The lateral displacement of the housing 51 and the protrusion 52 relative to the longitudinal axis is clearly visible in FIGS. 8(*b*) and 8(*d*).

Figure 9:
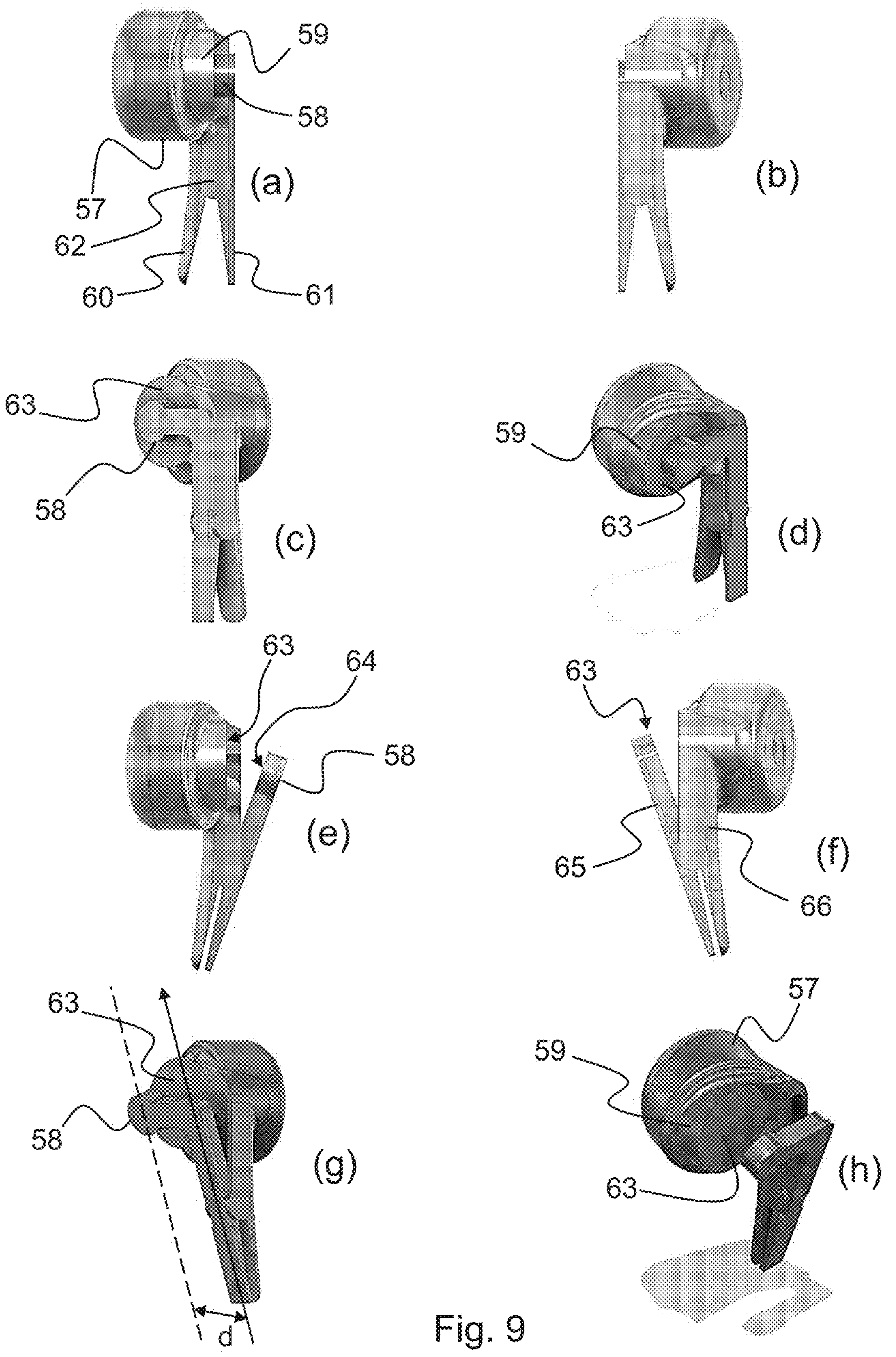
FIGS. 9(*a*), 9(*b*), 9(*c*) and 9(*d*) show a third embodiment of a device according to the present invention in the closed state of the holding means.

With reference to FIGS. 9(*a*) through 9(*h*) there are shown perspective representations of another embodiment of the device according to the invention of the pivotal variation. This embodiment comprises a main housing 57 provided with an extension 59, the surface portion 63 of which together with a corresponding surface portion 63 on the opposite part of the holding means provides releasable attachment to the tragus of a user. This embodiment deviates from the embodiment shown in FIGS. 7 and 8 in that in the closed state of the holding means, the surface portion 42 of the extension 59 of the housing 57 in the closed state of the holding means (when the device is not provided on the tragus of a user) is substantially in parallel with the corresponding surface portion 63 of the end portion 58 of the holding means as perhaps most clearly visible in FIGS. 9(*d*) and (*e*). As in the previous embodiment, the holding means comprises at one longitudinal end the handling portion 60, 61, a centrally positioned hinge or pivot portion 62 and at the other longitudinal end, the attachment region that is configured for releasable attachment to the tragus of the user.

Figure 10:
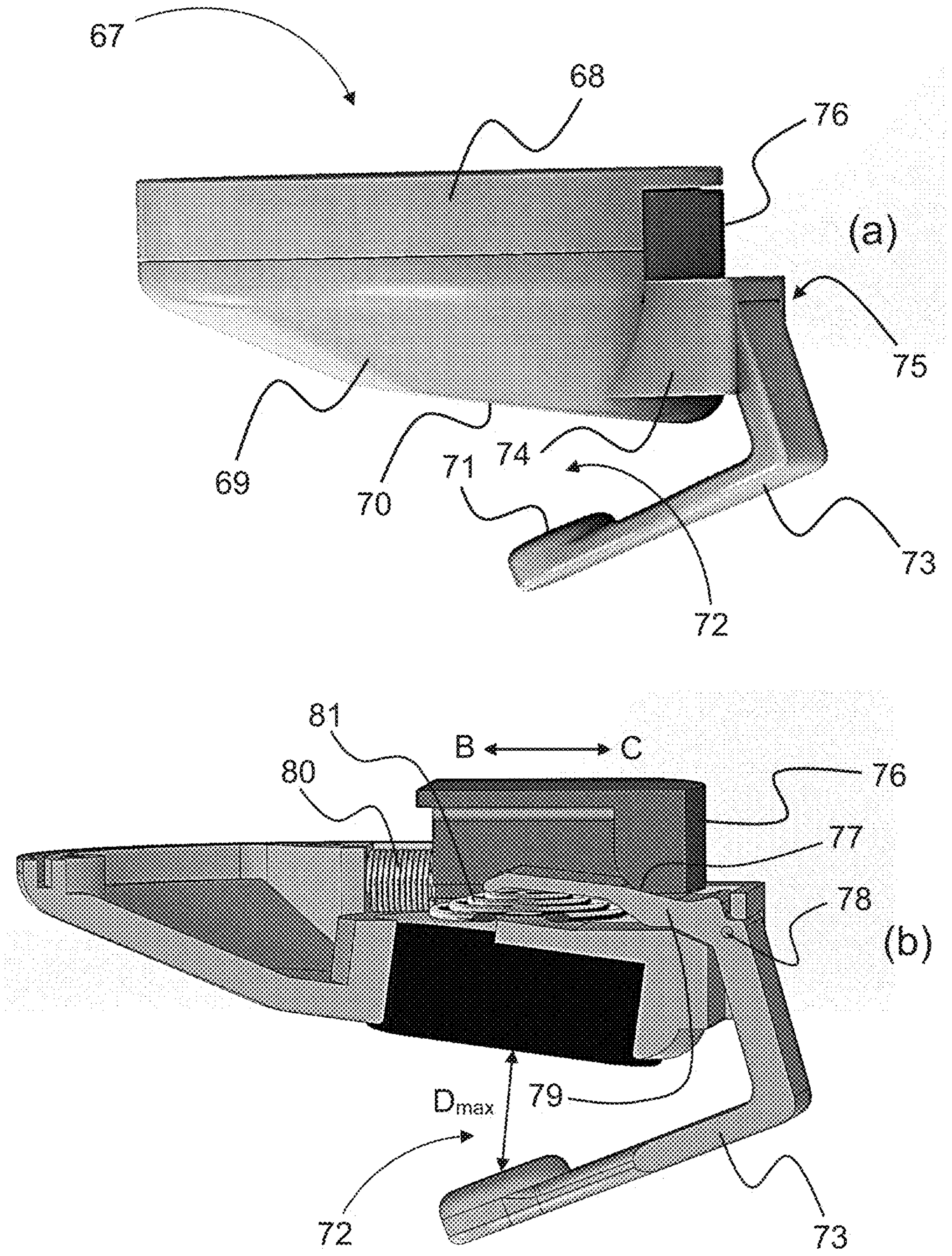
FIGS. 10(*a*) and (*b*) show a fourth embodiment of the device according to the invention with the holding means in an open state that allows fitting the device onto the tragus of a user.

With reference to FIGS. 10(*a*) and (*b*) there is shown still another embodiment of the device according to the invention of the pivotal version generally indicated by reference numeral 67 with holding means in an open state that allows fitting the device onto the tragus of a user. The housing comprises an outer or top portion 68 (facing away from the surface of the user's head when the device is fitted on the ear of the user) and an inner or bottom portion 69 (facing towards the tragus of the user) and comprising a contact region 70 configured to form contact with the outer surface of the tragus. The holding means comprises a bended arm section 73 pivotally mounted about a pivot axle 78 provided in a region 75 in an extension 74 to the inner portion 68 of the housing. A gap D is formed between the contact region 70 of the housing and a corresponding contact part 71 on the end of the bended arm section 73 opposite the contact region 70 of the housing.

Figure 11:
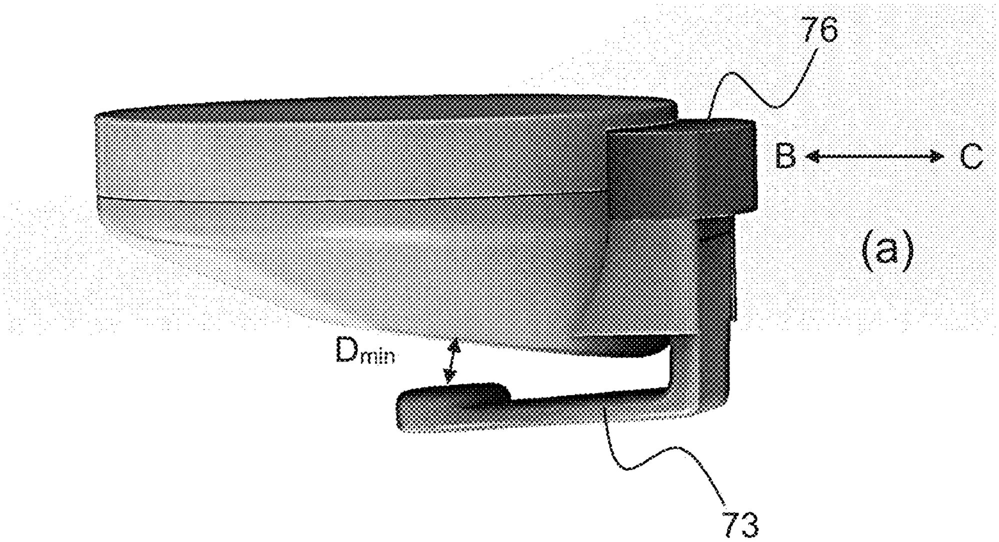
FIGS. 11(*a*) and (*b*) show the fourth embodiment of the device according to the invention with the holding means in an exemplary closed state that the device could have when placed correctly on the tragus of a user.
Figure 11:
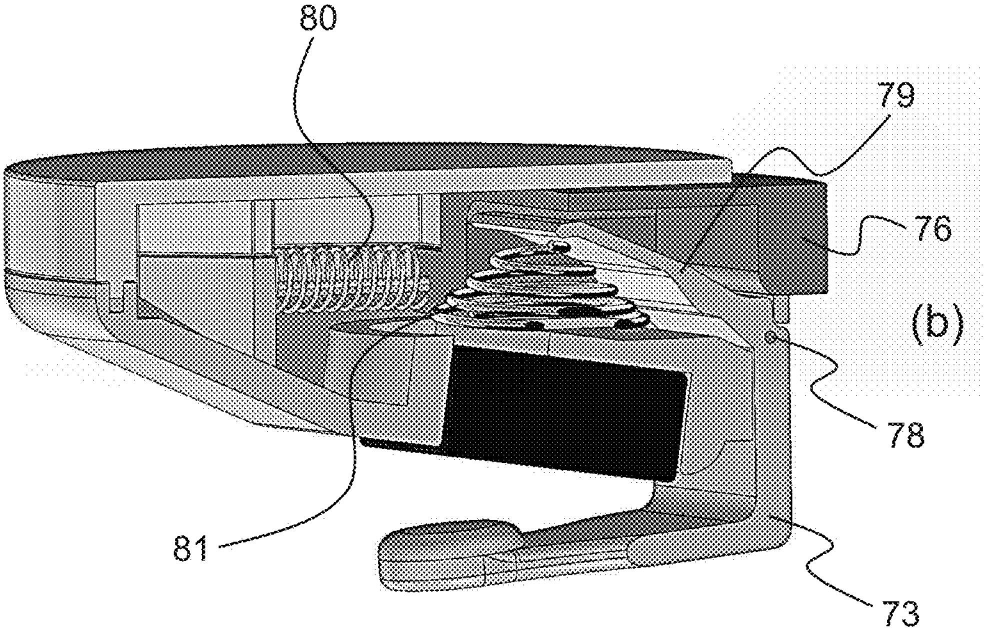

In FIGS. 11(*a*) and (*b*) the fourth embodiment of the invention is shown in the closed state, wherein the gap D has its minimum width.

The function of the holding means of the embodiment shown in FIGS. 10 and 11 appears from FIG. 10(*b*) and FIG. 11(*b*). Referring to FIG. 10(*b*) the holding means comprises a pivot arm 73, 79 comprising the bended arm section 73 and an internal arm section 79. The pivot arm is pivotally mounted on the pivot axle 78 such that it can pivot between the open state shown in FIGS. 10(*a*) and (*b*) and the closed state shown in FIGS. 11(*a*) and (*b*).

The internal arm section 79 is biased by a first spring member 81 that exerts an upwardly (as seen in the figures) directed force on the internal arm section 79. In the open state shown in FIG. 8(*b*) a pivotal movement in the upward direction is prevented by the displaceable user operating member 76 that can be displaced in the direction indicated by the double arrow B-C. The user operating member 76 is biased by a second spring member 80 that forces the user operating means 76 in an outward direction relative to the housing 68, 69. During fitting of the device on the tragus of a user, the user operating means 76 is displaced in direction B and when the user operating means 76 is released by the user, the internal ark section 79 is free to pivot about the pivot axle 78 under the force of the first spring member 81, whereby the bended arm section 73 pivots towards the contact region 70 on the bottom portion 69 of the housing. The contact between the internal arm section 79 and the user operating means 76 is established in the region 77 as shown in FIG. 10(*b*).

Figure 13:
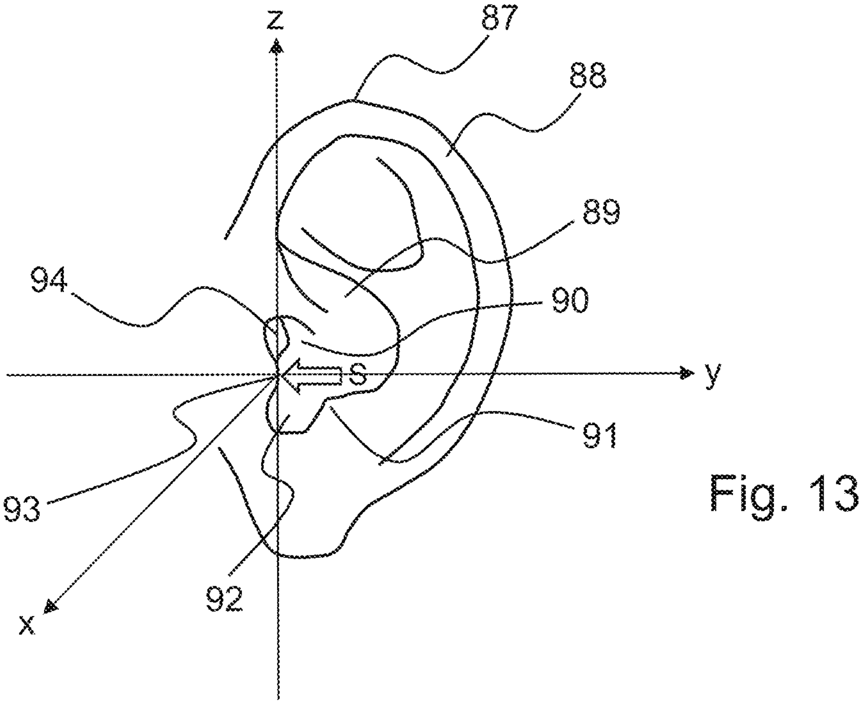
FIG. 13 shows a schematic side view of a left human pinna indicating various anatomical structures of the pinna.

The dimension of the gap Dmax (FIG. 10(*b*)) should preferably be chosen such that no deformation of the tragus in the direction indicated by S in FIG. 13 takes place during fitting of the device unto to tragus of the user. In this way, the only deformation of tragus caused by the holding means is the inevitable (and necessary) compression of tragus when the device is fitted on the tragus.

Figure 12:
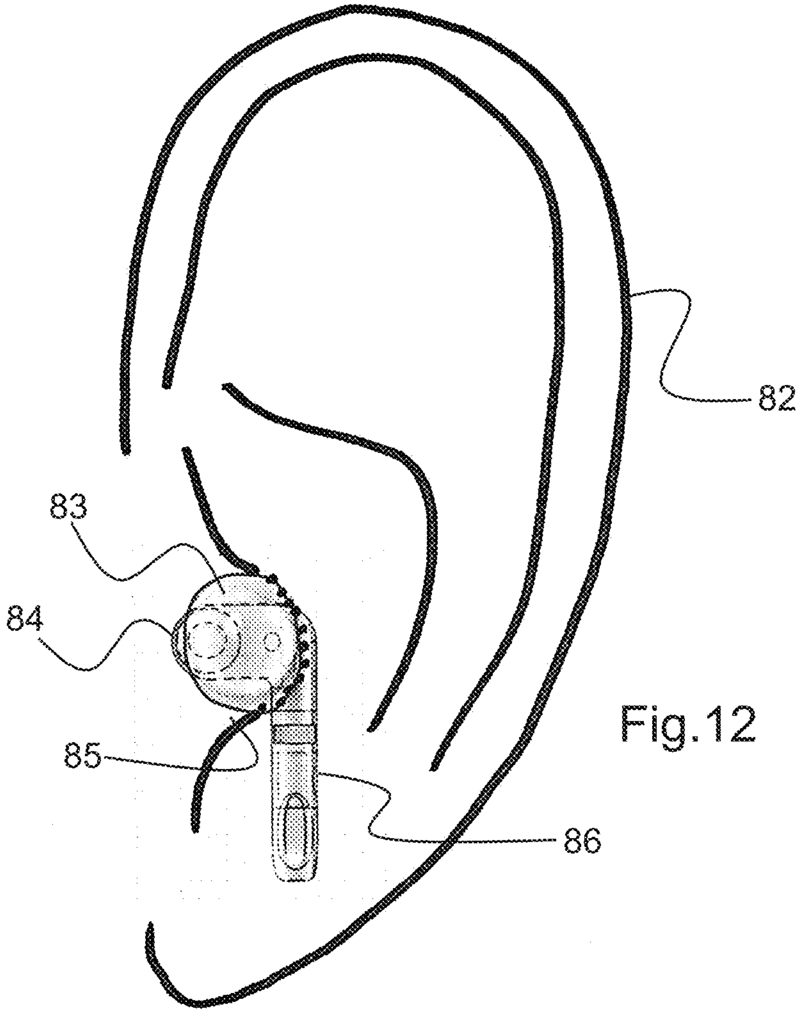
FIG. 12 shows a schematic side view of a left human pinna provided with the device according to the second embodiment of the invention.

With reference to FIG. 12 there is shown the embodiment of the invention described in FIGS. 7 through 9 placed on the pinna of a user. For interpretation of the anatomical structures of the human pinna that are relevant for the understanding of the present invention, reference is made to FIG. 13 that shows a schematic side view of a left pinna of a human indicating the designations of the main anatomical structures of the pinna.

The configuration of the device according to this embodiment of the invention provides for a very stable and reproducible placement of the device on the pinna 87 of a user. As shown in FIGS. 7, 8 and 9, the bottom surface 43, 53 of the housing 42, 51, is provided outside of, and in contact with (in the embodiment shown in FIG. 9 via the extension 59 of the housing 57) the external surface of the tragus 93 and the neighboring area of the head, such that vibrations of the bone conductor provided inside the housing 42, 51 is transmitted partly to the tragus 93 and in turn to the skeletal structure of the user's head and partly via air conduction through the user's ear canal to the tympanic membrane of the user. The opposite portion of the holding means, i.e. the surface of the protrusion or portion 44, 58 that faces the bottom portion 43, 63 of the housing 42, 51 presses against the interior surface of the tragus 93, whereby the device is reliably held attached to the tragus 93. The holding means 86 extends downwardly (as seen in FIG. 12) outside of the inter-tragal notch 92.

With reference to FIG. 13, the main anatomical structures of the human pinna 87 are the helix 88, the cavum concha 89, the cymba concha 90, the ear canal 94, the tragus 93, the antitragus 91 and the inter-tragal notch 92.

Figure 14:
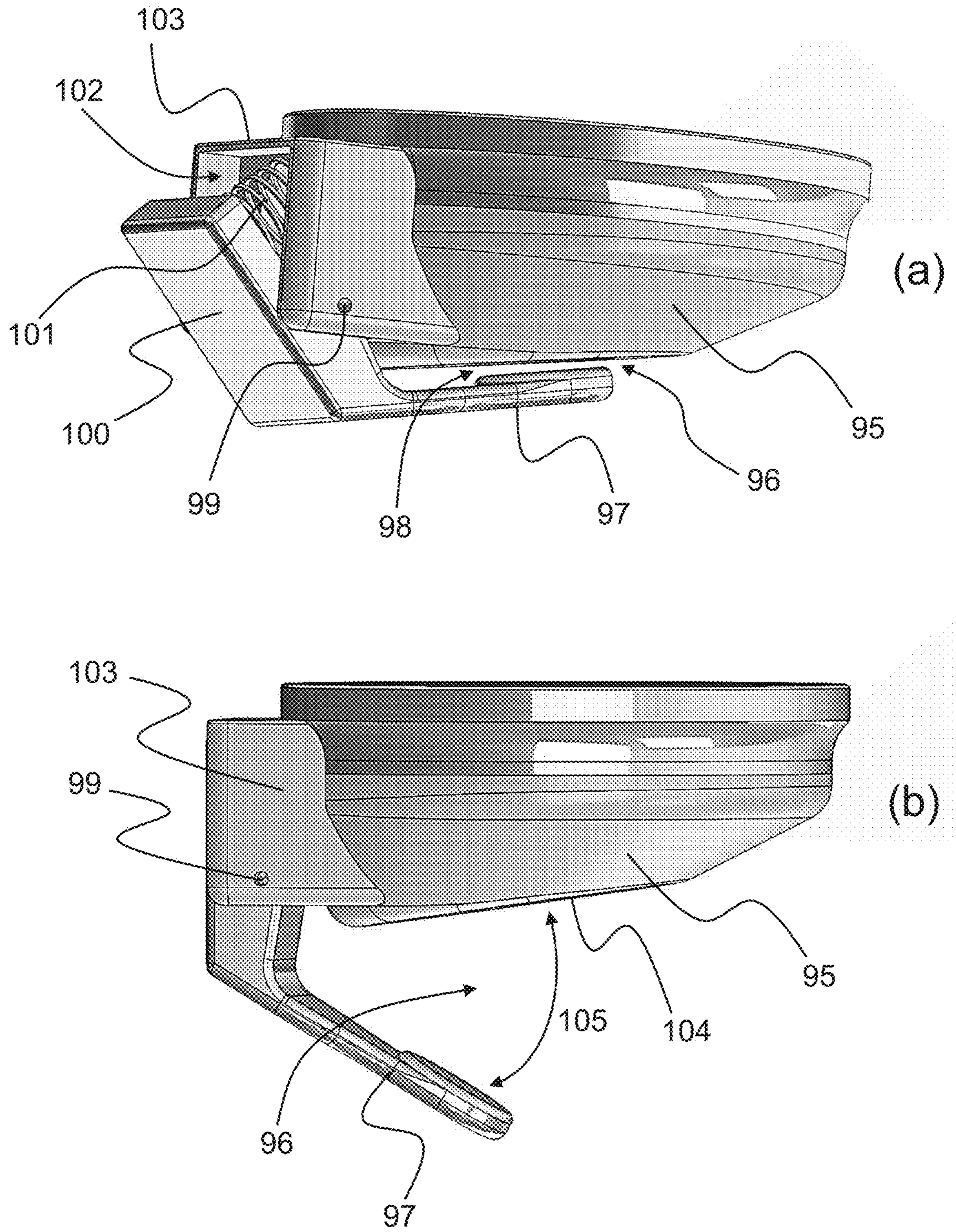
FIGS. 14(*a*) and (*b*) show a fifth embodiment of the invention a closed state (a) and in an open state (b).

With reference to FIG. 14 there is shown still another embodiment of the invention in a closed state (a) and in an open state (b). In this embodiment the housing 95 is provided with an extension 103 that is at least partly hollow 102 in order to accommodate a biasing member, in FIG. 14(*a*) shown as a compression spring 101, although other biasing members might alternatively be used. The biasing member 101 exerts a force on a first part 100 of an arm 97, 100 that is pivotally mounted on a pivot axle 99 such that the arm 97, 100 can pivot between the closed state shown in FIG. 14(*a*) and an open state shown in FIG. 14(*b*). Thereby the width of the gap 96 formed between the second portion 97 of the arm 97, 100 and the bottom portion 104 of the housing 95 can be varied, for instance between the two states indicated by 96 and 105 in FIG. 14. When the gap is open 105, the device can be fitted onto the tragus of the user and in the closed state, the second arm portion 97 together with the bottom portion 104 of the housing 95 provides a firm attachment of the device to the tragus of the user.

In order not to deform the tragus of the user in an undesirable manner during fitting of the device to the tragus it is important to dimension the holding means, specifically the dimensions of the holding means in such a manner that the only deformation of the tragus caused by the holding means is the inevitable and in fact necessary compression of the tragus, i.e. a reduction of the thickness of the tragus that takes place when the holding means fixes the device to the tragus. An undesirable deformation of the tragus would occur if the holding means were designed in such a manner that the tragus would be pushed towards the surface of the head of the user indicated by S in FIG. 13, during fitting of the device onto the tragus 93. This would for instance be the result of the gap between the contact member and the contact area or surface on the housing of the respective holding means of other embodiments of the invention not being open enough, or with sufficient width, in the open state of the respective holding means to accommodate the tragus during fitting of the device. Referring to FIG. 13, the holding means of the invention will compress the tragus 93 in the negative x-direction, when the device is fitted unto the tragus, whereas the device according to the invention will cause substantially no deformation of the tragus 93 in directions in the (y, z)-plane of the tragus.

Above, different embodiments of the invention have been described, but it is understood that other embodiments of the invention would be conceivable and that these would also fall within the scope of the invention as defined by the independent claim.

The invention claimed is:

1. An out-ear audio device comprising a bone conductor transducer (1) configured to transfer an audio signal by means of bone conduction to an ear of a user, the device comprising a housing (2) accommodating the bone conductor transducer (1), the device further comprising holding means (3) configured to releasably attach the housing (2) to the tragus of the user, wherein:

the holding means (3) together with a portion (4) of the outer surface of the housing (2) of the audio device forms a substantially U-shaped structure, where the holding means (3) comprises a contact member (10, 28) formed for contact with an inner surface of the tragus that faces towards the head of the user; and wherein a contact region that is formed for contact with an outer surface of the tragus corresponding to said inner surface of the tragus is provided by a portion (4) of the housing (2), which portion (4) is in vibrational contact with the bone conduction transducer (1), such that vibrations generated by the bone conductor transducer (1) is transmitted to the contact region;

where the contact member and the contact region form a gap (27) between the contact member (10, 28) and the contact region (4); and wherein the holding means (3) is displaceably or pivotally connected to the bone conductor transducer (1) either directly or via the housing (2), such that the distance between the contact member (10) and contact region (4) can be varied, and wherein the housing (2) and/or the holding means (3) is provided with biasing means, such as a spring member 5, 6, 7; 15, 18), that is configured to force the contact member (10, 28) and the contact region (4) against each other, whereby the contact member (10, 28) and the contact region (4), respectively, presses against said inner and outer surfaces of the tragus, when the audio device is provided on the tragus.

2. The device according to claim 1, wherein the holding means (3) comprises a portion (5, 12, 18, 21) that is in direct mechanical connection with a surface portion of the bone conduction transducer (1).

3. The device according to claim 1, wherein the holding means (3) comprises a spring member (5, 6, 7; 15; 18), a portion of which is in mechanical connection with a portion of the bone conductor transducer (1) either directly or through an intermediate member (12).

4. The device according to claim 1, wherein the holding means (3) comprises a pivot arm (8, 26) at one longitudinal end of which the contact member (10, 28) is provided, the pivot arm (8, 26) being connected to a torsional spring member (5, 6, 7; 21, 22, 23, 25) comprising a first arm (5), a second arm (7) and an intermediate coil portion 6, which torsional spring member biases the contact member (10, 28) against the contact region (4).

5. The device according to claim 4, wherein said first arm (5) of the torsional spring member is in direct mechanical connection with a surface portion of the bone conductor transducer.

6. The device according to claim 4, wherein the pivot point of the pivot arm (26) is located in the open central region of the intermediate coil portion (6, 23) of the torsional spring member.

7. The device according to claim 1, wherein the holding means comprises two parts (45, 46) hingedly/pivotally connected at a section (49) and biased by a member, such as a spring, forcing the longitudinal end of each of the two parts (45, 46) adjacent to the housing (42) against each other, where the housing (42) is provided at said longitudinal end of one of the two parts (45, 46) of the holding means and where the other of said two parts (45, 46) of the holding means adjacent to the housing (42) is provided with a corresponding attachment portion or protrusion (44) that together with a bottom portion (43) of the housing (42) provides an attachment region (50) configured to attach the holding means releasibly to the tragus of a user.

8. The device according to claim 7, wherein the holding means are configured as a structure resembling that of a traditional clothes peg.

9. The device according to claim 7, wherein the housing (42) is tilted relative to said attachment portion (44) such that the bottom surface (43) of the housing (42) in the closed state of the holding means forms an angle with the top surface (44') of the attachment portion or protrusion (44), which angle is greater than zero.

10. The device according to claim 7, wherein the housing (42) is provided on one longitudinal end of a first part (46) of the holding means and where the housing (42) is provided with a surface portion (43) configured for establishing contact to the outer surface of the tragus of a user and where a second part (45) of the holding means is provided opposite to the surface portion (43) of the housing (42) and where the second part (45) of the holding means is provided with a corresponding surface portion (44') configured for establishing contact to the inner surface of the tragus of a user, where said surface portion (43) of the housing (42) and said corresponding surface portion (44') are substantially parallel to each other, when the holding means is in the closed state without the device being provided on the tragus of a user.

11. The device according to claim 1, wherein the holding means comprises a pivot arm (73, 79) pivotally connected to the housing (68, 69) of the device, where the pivot arm (73, 79) comprises a bended arm section (73) and an internal arm section (79), where the bended arm section (73) together with a contact region (70) on the housing forms a gap (72) configured to accommodate the tragus of a user, where the device is provided with user operating means (76) configured to be movable between a position (B) where the gap (72) is maximally open (Dmax) and a position (C) where the gap (72) is minimally open (Dmin), where the internal arm section (79) is biased in a direction that will pivot the pivot arm (73, 79) such that the width of the gap (72) is reduced, when the user operating means (76) is displaced in a direction that enables the pivot arm (73, 79) to undergo pivotal movement relative to the housing of the device.

12. The device according to claim 1, wherein the holding means comprises a pivot arm (97, 100) pivotally connected to the housing (73) of the device, where the pivot arm comprises a bended arm section (97) and a user operating arm section (100), where the pivot arm is pivotally mounted on a pivot axle (99) connected to the housing (73), where the bended arm section (97) together with a contact region (104) on the housing forms a gap (96) configured to accommodate the tragus of a user, where the device is provided with biasing means (101) acting on the housing (73) and the user operating arm section (100) thereby forcing the user operating arm section (100) away from the housing (95) and the bended arm section (97) in a direction towards the contact region (104) of the housing (95).

13. The device according to claim 1, wherein said holding means (3) comprises a first surface portion (35) facing a correspondingly shaped second surface portion (33) of said housing (2), where said first and second surfaces portions (35, 33) are configured such that they can undergo a sliding movement (A) relative to each other, whereby the width of said gap (31) can be varied, and where the second surface portion (33) is provided with first engagement means (34) corresponding to second engagement means (40) provided on the first surface portion (35).

14. The device according to claim 13, wherein said first engagement means comprises elongate recesses (34) and said second engagement means comprises protrusions (40) configured to correspond to the recesses (34), such that the protrusions (40) can undergo a sliding movement in the recesses (34).

15. The device according to claim 13, wherein said second engagement means comprises elongate recesses (34) and said first engagement means comprises protrusions (40) configured to correspond to the recesses (34), such that the protrusions (40) can undergo a sliding movement in the recesses (34).

16. The device according to claim 1, wherein the device is provided with microphone means configured to pick up sounds in the surroundings of the user, where the output signal from the microphone means is provided to processing means configured to provide a processed version of the output signal from the microphone and provide the processed version to the bone conductor (1), whereby the device can be used for hearing assistance or other audio processing features.

* * * * *